United States Patent [19]

Tayloe

[11] Patent Number: 5,463,400
[45] Date of Patent: Oct. 31, 1995

[54] METHOD AND APPARATUS FOR SYNCHRONIZING TO A MULTI-BEAM SATELLITE TDMA COMMUNICATION SYSTEM

[75] Inventor: Daniel R. Tayloe, Phoenix, Ariz.

[73] Assignee: Motorola, Inc., Schaumburg, Ill.

[21] Appl. No.: 269,273

[22] Filed: Jun. 30, 1994

[51] Int. Cl.⁶ .................................................... H04B 7/185
[52] U.S. Cl. ............................................ 342/352; 455/33.1
[58] Field of Search ...................................... 342/352, 354; 455/33.1

[56] References Cited

U.S. PATENT DOCUMENTS

| | | |
|---|---|---|
| 4,860,018 | 8/1989 | Counselman, III . |
| 5,012,254 | 4/1991 | Thompson ............................. 342/373 |
| 5,019,824 | 5/1991 | Kumar . |
| 5,227,802 | 7/1993 | Pullman et al. ....................... 342/352 |

Primary Examiner—Theodore M. Blum
Attorney, Agent, or Firm—Gregory J. Gorrie

[57] ABSTRACT

In a satellite based cellular communication system where the satellites move with respect to the surface of the Earth and have antenna patterns covering thousands of miles, subscriber units must initially access the communication system at a proper frequency and during a proper time slot. Subscriber units compensate for the propagation delay and frequency-shift associated with the distance to a satellite and the velocity of the satellite. The subscriber unit determines the antenna beam of the satellite within which it is located and receives the antenna beam's center coordinates. The location of the satellite is calculated and the propagation distance to the satellite is estimated. Based on the distance to the satellite and the satellite's velocity, the subscriber unit transmits an acquisition request at the proper time and frequency so that it is received within the satellite's timing window. The subscriber unit also adjusts is transmission frequency to compensate for the frequency shift associated with satellite's motion.

20 Claims, 6 Drawing Sheets

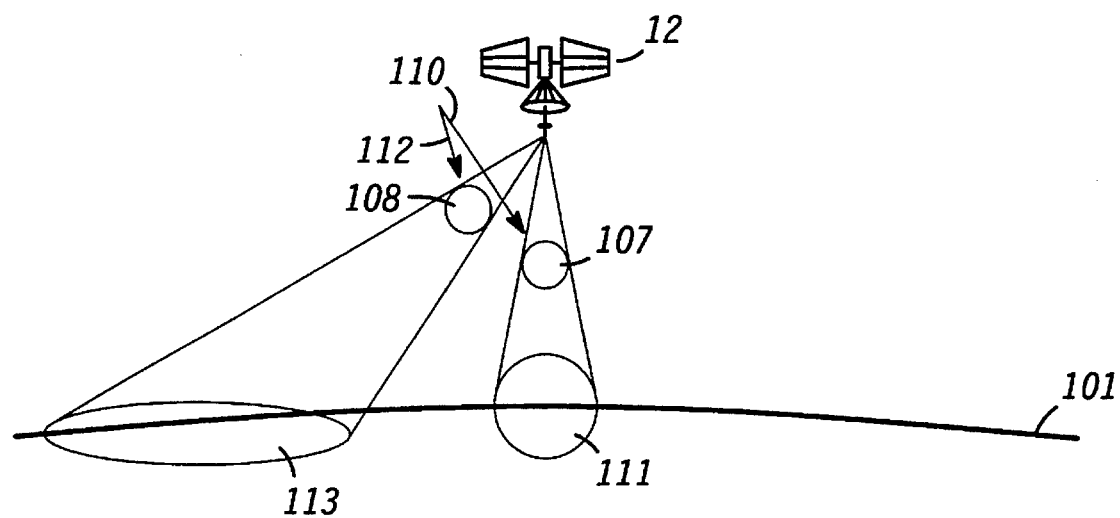
FIG. 6
FIG. 7
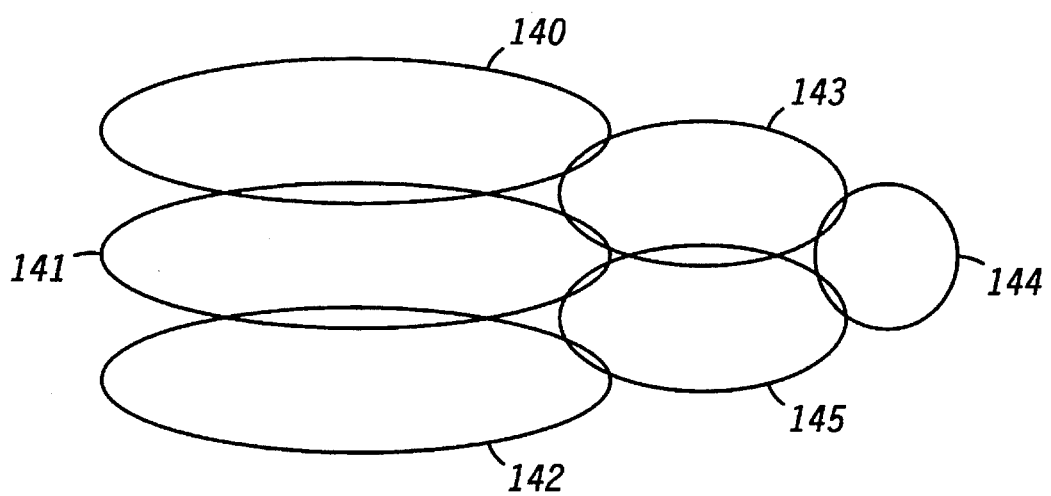

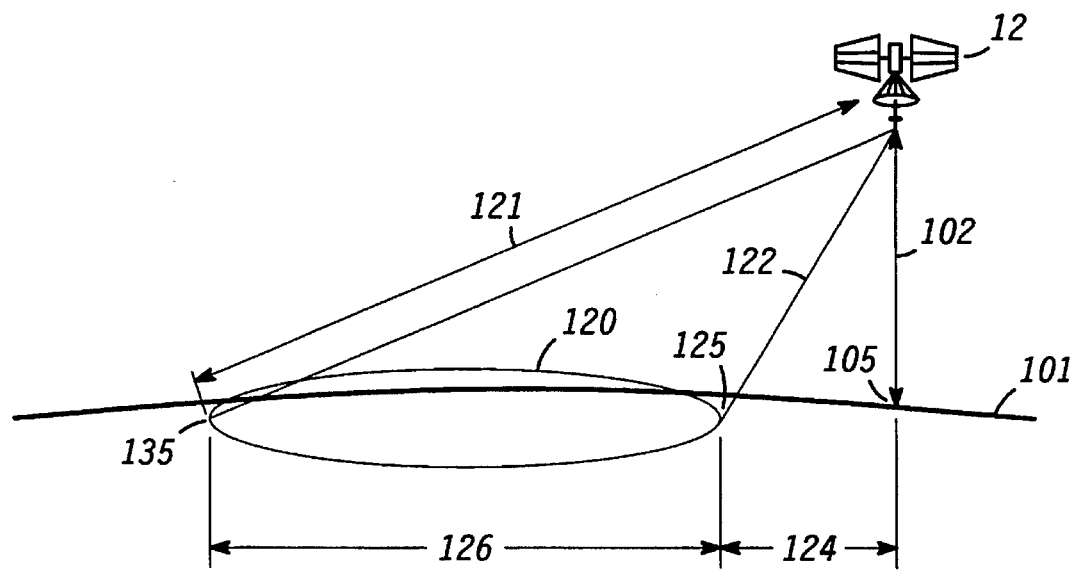
FIG. 8
FIG. 9
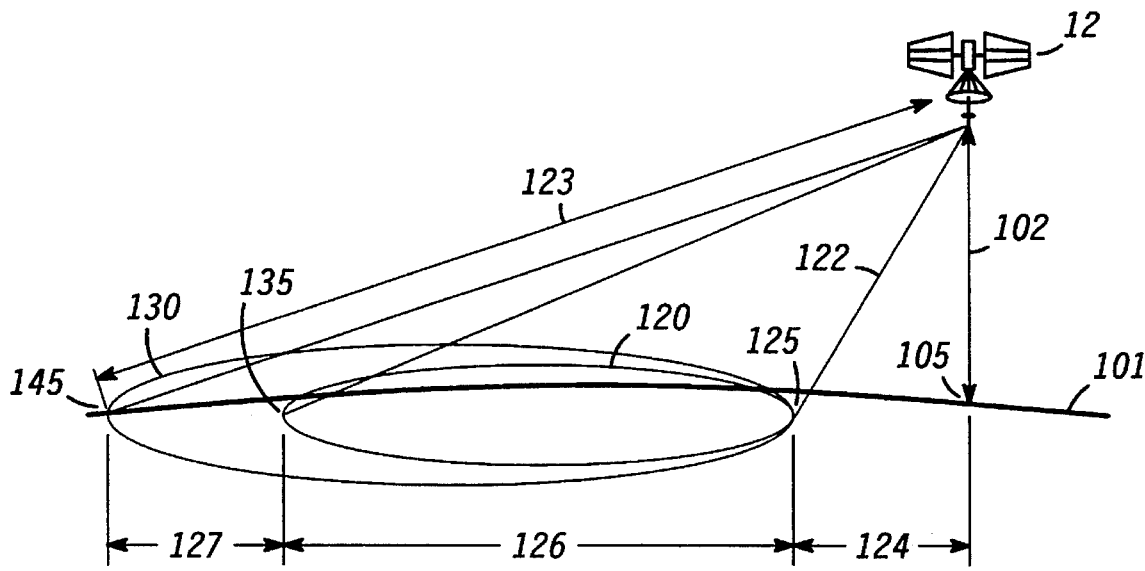

METHOD AND APPARATUS FOR SYNCHRONIZING TO A MULTI-BEAM SATELLITE TDMA COMMUNICATION SYSTEM

CROSS-REFERENCE TO RELATED APPLICATIONS

This application is related to co-pending U.S. Patent Application Ser. No. 08/237,705, filed on May 3 of 1994, which is assigned to the same assignee as the present application.

FIELD OF THE INVENTION

This invention relates in general to the field of Time Division Multiple Access (TDMA) communication systems. More specifically, the present invention relates to digital cellular communication systems having communication stations with multi-beam antennas.

BACKGROUND OF THE INVENTION

In Time Division Multiple Access (TDMA) communication systems, subscriber units must initially access the communication system at a proper frequency and time slot. Failure to do so will result in the inability for the subscriber to access the system and interference with ongoing calls in adjacent time slots. This is especially true where the timing windows for acquisition to communication stations are short and the frequency bandwidth is narrow. In satellite based communication systems where the communication stations are moving with respect to the subscriber units, subscriber units must compensate for the propagation delay associated with the distance to a satellite and the frequency shift associated with the velocity of the satellite. This is difficult to do without knowing the distance to the satellite and the satellite's velocity with respect to the subscriber unit. This situation is even more difficult where the satellites project multiple beams and the size of the beams is very large because difference in the propagation delay across a beam may exceed the satellite's acquisition timing window. This is especially true in low-Earth orbit satellite systems because the positions and orbits of the satellites are not fixed with respect to the surface of the Earth.

Thus what is needed is a method and apparatus for accessing a communication system that projects antenna beams that are hundreds or even thousands of miles in length. What is also needed is a method and apparatus for synchronizing to a communication system's timing windows where the distances to the subscriber units are unknown. Thus what is also needed is a subscriber unit that determines its position relative to a communication station and sends acquisition signals in sync with the system's acquisition timing windows. Thus what is also needed is a method and apparatus of initially accessing a Time Division Multiple Access (TDMA) communication system without interfering with ongoing calls in adjacent time slots and adjacent frequency channels.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

FIG. 6 illustrates the ground projection shapes of inner and outer antenna beams;

FIG. 7 shows a top view of a portion of the ground projection of a satellite's antenna beams;

FIG. 8 shows the approximate distances associated with a ground projection region of an outer beam;

FIG. 9 shows the approximated distances associated with far outer regions having reduced signal levels.

The exemplification set out herein illustrates a preferred embodiment of the invention in one form thereof, and such exemplification is not intended to be construed as limiting in any manner.

DETAILED DESCRIPTION OF THE DRAWINGS

A "satellite" is defined herein to mean a man-made object or vehicle intended to orbit a celestial body (e.g., Earth). A "constellation" is defined herein to mean an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. As used herein the terms "cell" and "antenna pattern" are not intended to be limited to any particular mode of generation and include those created by either terrestrial or satellite cellular communications systems and/or combinations thereof. The term "satellite" is intended to include both geo-stationary and orbiting satellites and/or combinations thereof including low earth orbiting (LEO) satellites.

Figure 1:
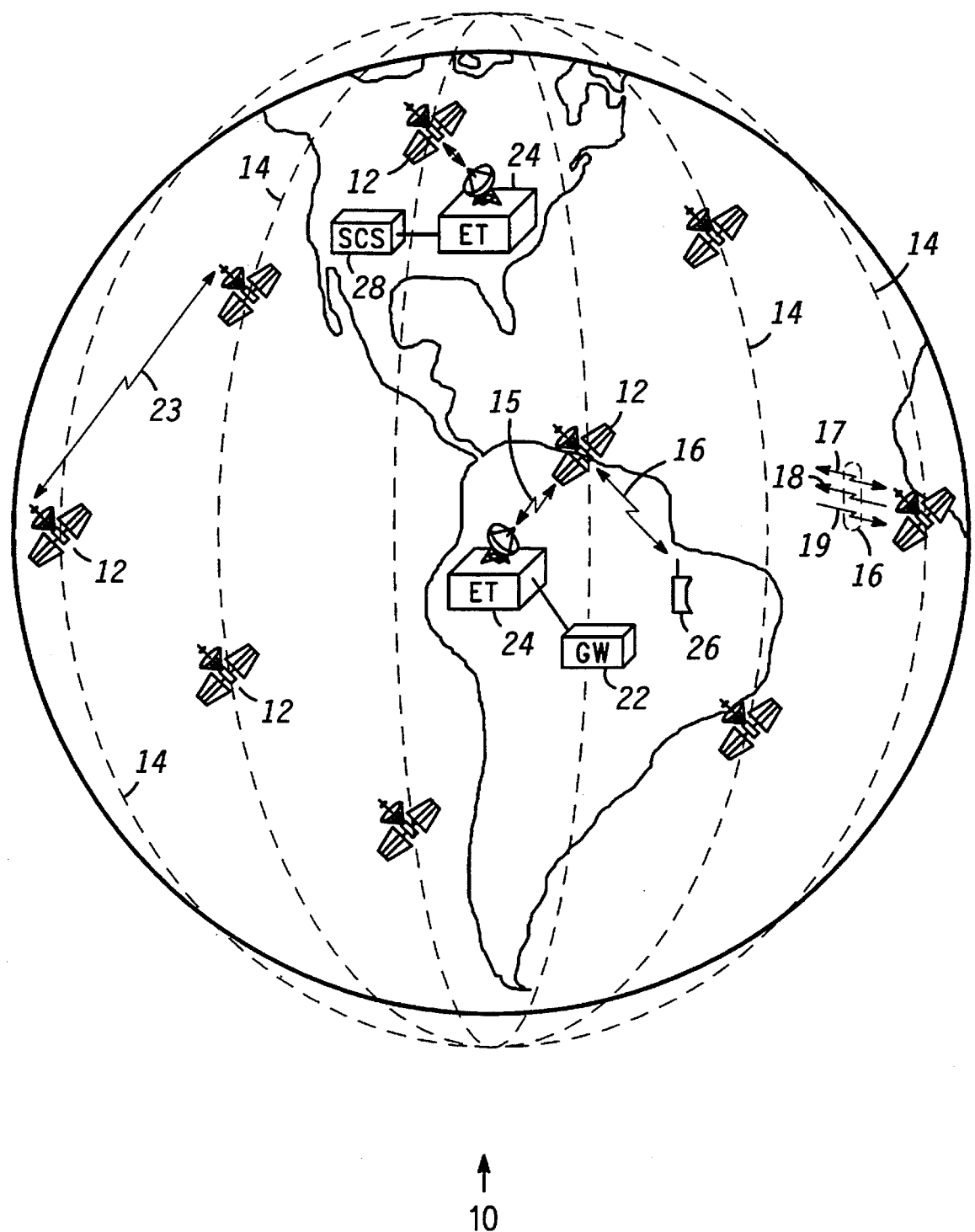
FIG. 1 illustrates a highly simplified diagram of a satellite based communication system.

FIG. 1 illustrates a highly simplified diagram of satellite based communication system 10. Communication system 10 is dispersed over and surrounding a celestial body (e.g., Earth) through use of orbiting satellites 12 occupying orbits 14. The present invention is applicable to systems including satellites having low-Earth and medium-Earth orbits, and satellites having relative movement. Additionally, it is applicable to orbits having any angle of inclination (e.g., polar, equatorial or other orbital pattern).

Exemplary communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

For example, each orbit 14 encircles Earth at an altitude of around 450 miles, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of Earth at any instant.

For the example shown, satellites 12 travel with respect to Earth at around 16,000 miles per hour, allowing satellite 12 to be visible to a terrestrial station for a maximum period of circa nine minutes.

Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

Communication system 10 may accommodate any number, potentially in the millions, of subscriber units 26. In the preferred embodiments of the present invention, subscriber units 26 communicate with nearby satellites 12 via subscriber links 16. Subscriber links 16 may be generally referred to as traffic channels. Links 16 encompass a limited portion of the electromagnetic spectrum that is divided into numerous channels. Links 16 are preferably combinations of L-Band frequency channels and may encompass Frequency Division Multiplex Access (FDMA) and/or Time Division Multiple Access (TDMA) communications (infra) or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12. In one embodiment where the antenna patterns are divided up into a plurality of cells, broadcast channels 18 may be dedicated to particular cells.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, as a minimum, a two-way voice conversation. To support real-time communications, a time division multiple access (TDMA) scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like number of independent calls.

Satellites 12 communicate with other nearby satellites 12 through cross links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. ETs 24 are preferably distributed over the surface of the earth in accordance with geo-political boundaries. In the preferred embodiments, each satellite 12 may communicate with up to four ETs 24 and over a thousand subscriber units 26 at any given instant.

SCS 28 monitors the health and status of system communication stations (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

With the example constellation of sixty-six satellites 12, at least one of satellites 12 is within view of each point on Earth's surface at all times (i.e., full coverage of the Earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

The present invention is also applicable to constellations where full coverage of the Earth is not achieved (i.e., where there are "holes" in the communications coverage provided by the constellation) and constellations where plural coverage of portions of Earth occur (i.e., more than one satellite is in view of a point on the Earth's surface).

Figure 2:
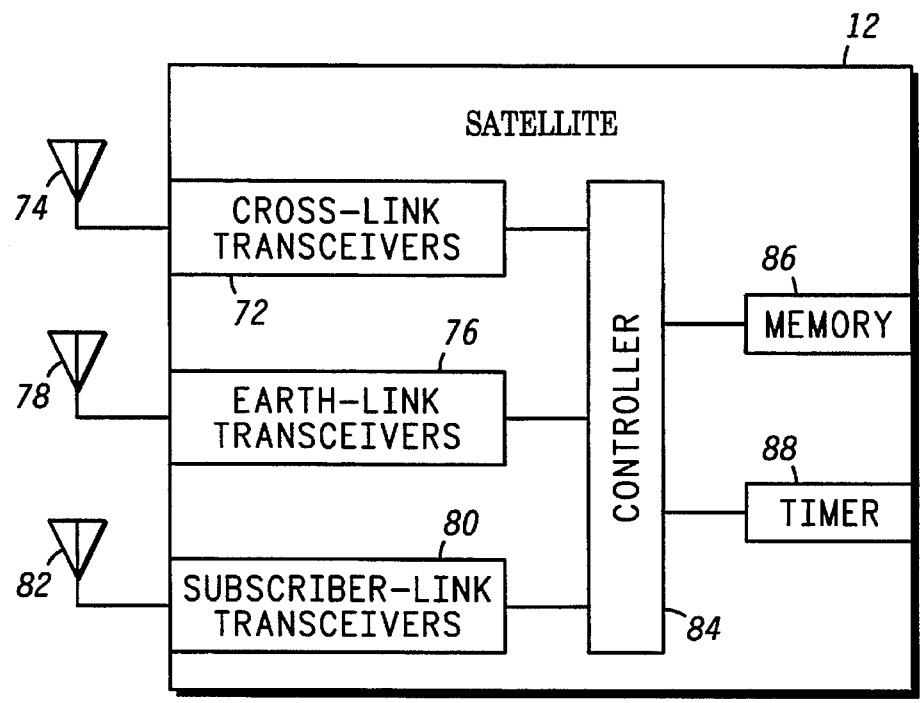
FIG. 2 illustrates a simplified block diagram of a satellite radio communication station suitable for use in a preferred embodiment of the present invention.

FIG. 2 shows a block diagram of a satellite radio communication station provided by a satellite 12 suitable for use in a preferred embodiment of the present invention. Preferably, all satellites 12 within system 10 (see FIG. 1) include equipment as illustrated by the block diagram of FIG. 2. Satellite 12 includes cross-link transceivers 72 and associated antennas 74. Transceivers 72 and antennas 74 support cross-links to other nearby satellites 12. Earth-link transceivers 76 and associated antennas 78 support earth-links to communicate with earth terminals 24 (FIG. 1). Moreover, subscriber unit transceivers 80 and associated antennas 82 support subscriber units 26 (FIG. 1). Preferably, each satellite 12 may simultaneously support a link for up to several thousand or more of subscriber units 26 (FIG. 1). Of course, those skilled in the art will appreciate that antennas 74, 78, and 82 may be implemented either as single multi-directional antennas or as banks of discrete antennas. It is desirable that subscriber link antenna 82 be a phased array antenna capable of accessing many cells simultaneously.

A controller 84 couples to each of transceivers 72, 76, and 80 as well as to a memory 86 and a timer 88. Controller 84 may be implemented using one or more processors. Controller 84 uses timer 88 to maintain, among other things, the current date and time. Memory 86 stores data that serve as instructions to controller 84 and that, when executed by controller 84, cause satellite 12 to carry out procedures which are discussed below. In addition, memory 86 includes variables, tables, and databases that are manipulated due to the operation of satellite 12.

Subscriber unit transceivers 80 are desirably multi-channel FDMA/TDMA transceivers capable of transmitting and receiving on all different selectable frequencies during particular, selectable, time slots as directed by controller 84. Subscriber unit transceivers 80 contain multi-channel radios having sufficient number of channels to provide the desired number of transmission and reception frequencies for signal access and control and for the user voice and/or data. Controller 84 may provide for allocation of the frequency and time-slot assignments, cell-to-cell hand-off of subscriber units and other overhead and management and control functions. Subscriber unit transceivers 80 desirably provide for transmission and reception on any frequency channel set so that each subscriber unit transceivers 80 may, if needed, utilize the entire spectral capacity of all frequency channel sets by having the capability to handle all frequency and time slot assignments.

Figure 3:
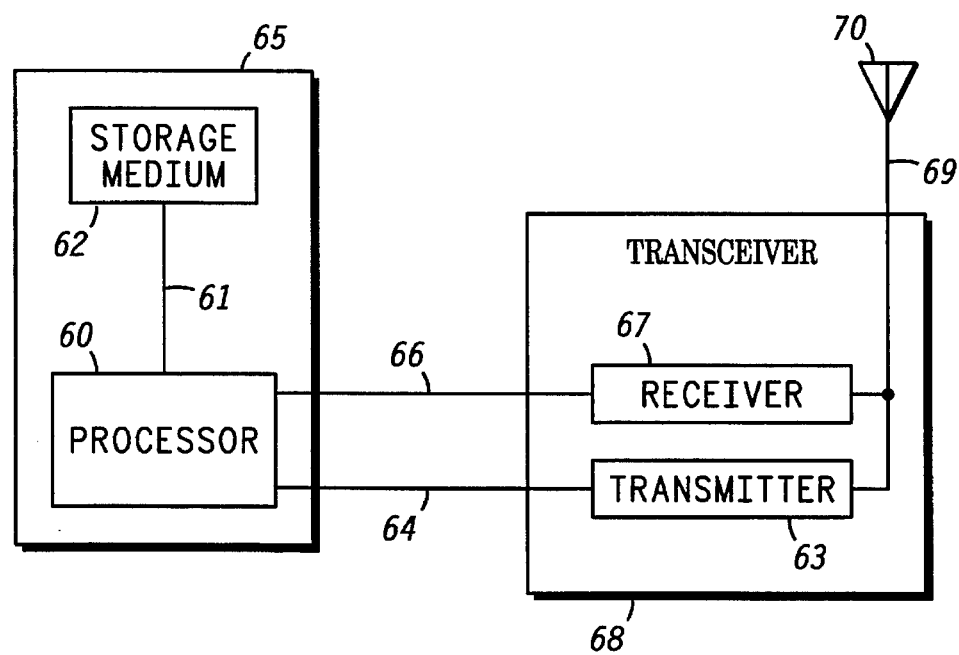
FIG. 3 illustrates a simplified block diagram of a portion of a system control station and a portion of an earth terminal suitable for use in a preferred embodiment of the present invention.

FIG. 3 illustrates a simplified block diagram of a portion of control station 65 and a portion of terrestrial station 68 in accordance with the present invention. Control station 65 and terrestrial station 68 are desirable part of SCS 28 (FIG. 1) and ET 24 (FIG. 1) respectively. Control station 65 comprises processor 60 coupled to associated storage medium 62 (e.g., random access memory or RAM, other semiconductor or magnetic read-write memory devices, optical disk, magnetic tape, floppy disk, hard disk etc.) via link 61. Terrestrial station 68 includes antenna 70 coupled to transmitter 63 and receiver 67 via link 69. Transmitter 63 and receiver 67 are coupled to processor 60 via links 64 and 66, respectively. Processor 60 desirably carries out procedures exemplified below and described in associated text. For example, in addition to performing other tasks as appropriate, processor 60 desirably stores results from such procedures in storage medium 62. Transmitter 63 and/or receiver 67 transmit messages to and/or receive messages from satellites 12.

Processor 60 generally controls and manages user access, message reception and transmission, channel set-up, radio tuning, frequency and time slot assignment, and other cellular radio communication and control functions not managed or provided for by controller 84 (FIG. 2). Among other things, processor 60 and/or controller 84 (FIG. 2) desirably executes procedures to allow user access to communication system 10. This may include procedures for protocols for channel setup and other associated functions as discussed below.

Figure 4:
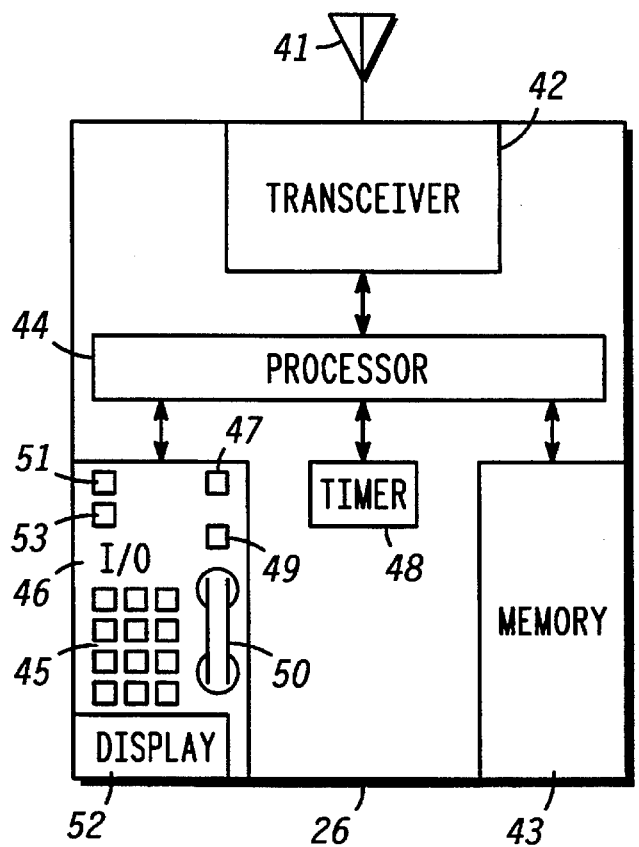
FIG. 4 illustrates a simplified block diagram of a typical subscriber unit suitable for use in a preferred embodiment of the present invention.

FIG. 4 shows a simplified block diagram of a typical subscriber unit suitable for use in a preferred embodiment of the present invention. Subscriber unit 26 (FIG. 4) is analogous to subscriber unit 26 of FIG. 1 which communicates with communication system 10. SU 26 may also communicate through communication system 10 to other SUs 26 or another telecommunication device. Subscriber unit 26 includes transceiver 42 which transmits and receives signals to and from communication system 10 using antenna 41. Transceiver 42 is desirably a multi-channel transceiver capable of transmitting and receiving on all frequency channels in specified time slots as required by communication system 10.

Transceiver 42 desirably comprises an acquisition channel transceiver portion, a broadcast channel receiver portion and a traffic channel transceiver portion. The acquisition channel transceiver portion communicates on one of several acquisition channels as determined by satellite 12 and is primarily used during access protocols when a subscriber desires access to communication system 10 as previously discussed. The traffic channel transceiver portion communicates with communication system 10 on a traffic channel assigned by satellite 12. Those of skill in the art will understand that the acquisition channel transceiver portion, the broadcast channel receiver portion and the traffic channel transceiver portion may be contained in one unit capable of all three functions. Transceiver 42 couples to a processor 44, which controls the frequency and timing parameters upon which transceiver 42 operates. In addition, processor 44 preferably controls the power level at which transceiver 42 transmits signals. Additionally, processor 44 desirably couples to input/output (I/O) section 46, timer 48, and memory 43. Processor 44 uses timer 48 to maintain the current date and time. Memory 43 includes semiconductor, magnetic, and other storage devices for storing data which serve as instructions to processor 44 and which, when executed by processor 44, cause subscriber unit 26 to carry out procedures which are discussed below. In addition, memory 43 includes variables, tables, and databases that are manipulated due to the operation of subscriber unit 26.

Input/output (I/O) section 46 of subscriber unit 26 is used to collect inputs from a user of subscriber unit 26 and to provide outputs for the user to perceive. I/O section 46 desirably includes, for example, keypad 45 to collect numbers that identify a party to whom a call may be directed, power switch 47 to control the energization and de-energization of subscriber unit 26, send key 49 to indicate when a called party's number has been entered, and hook switch 51. Display 52 may desirably be used to present visual information to the user, and alarm or beeper 53 may desirably be used to provide an audible alert to the user. Handset 50 desirably transforms audible signals into electrical signals, and vice-versa.

Conventional cellular radio units and systems are described for example in U.S. Pat. Nos. 4,783,779, 4,144,412, and 5,097,499 and satellite communication systems are described for example in U.S. Pat. Nos. 4,722,083 and 4,819,227. These patents are herewith incorporated by reference. Subscriber unit antennas 82 (FIG. 2), subscriber unit transceivers 80 (FIG. 2), control station 28 (FIG. 1) and earth terminal 24 (FIG. 1) perform those functions and contain at least those equipments conventionally associated with switched terrestrial or satellite cellular communication systems, plus additional functions and equipment explained in more detail below.

Figure 5:
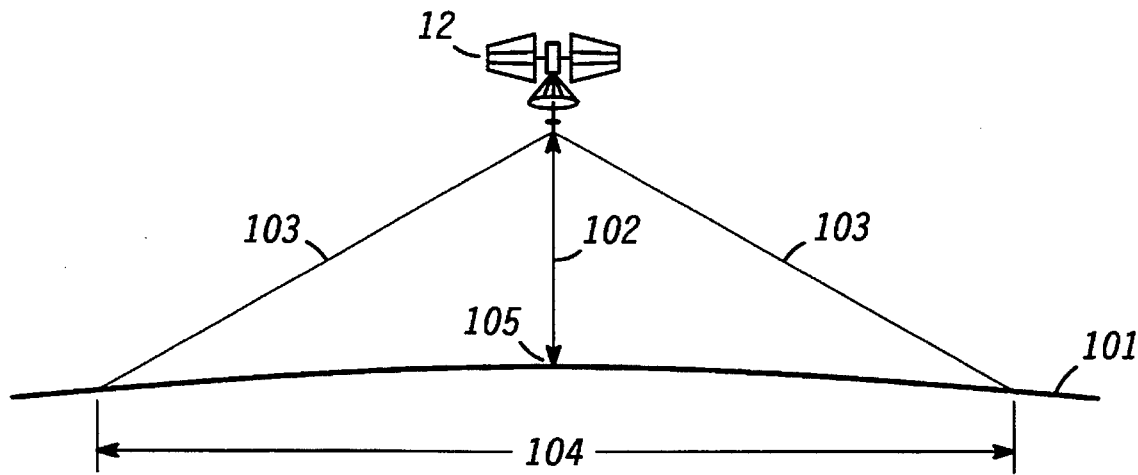
FIG. 5 illustrates the ground projection region of the antenna beams of a satellite.

FIG. 5 illustrates the ground projection region of the antenna beams of a satellite. FIG. 5 shows satellite 12 at altitude 102, projecting an antenna beam pattern over width 104 on the surface of the Earth 101. As discussed previously, in a preferred embodiment the altitude of satellite 12 is approximately 450 miles above the Earth's surface. In order to minimize the number of satellites required to provide complete global coverage, the width of the coverage area of a satellite is quite wide. For example to provide global coverage with sixty-six satellites in a low-Earth orbit of 450 miles, the ground projection of each satellite may cover up to 3000 miles in width. In a preferred embodiment, ground projection width 104 is approximately 3000 miles, altitude 102 is approximately 450 miles and the distance 103 from the satellite to the outer edge of the antenna beam would be approximately 1566 miles. To an observer at the edge of this 3000 mile circular area, the satellite projecting the beam can be seen just slightly above the horizon. Therefore, assuming the beam projections from the satellite are substantially circular, the only ground projection that will be circular, will be the ground projection directly under the satellite. Point 105 is shown as directly below satellite 12 and would be located in an antenna beam with a substantially circular ground projection. Beams projected at any angle from the satellite, on the other hand, form substantially elliptical ground projections on the surface of the Earth.

FIG. 6 illustrates the ground projection shapes of inner and outer antenna beams of satellite 12 of a preferred embodiment of the present invention. Inner beams 110 and outer beams 112 both have substantially circular cross sectional areas 107, 108. However, when the beams are projected on the surface of the Earth, the ground projection of the outer beams becomes more elliptical in shape. As shown by FIG. 6, outer beam 112 has an elliptical ground coverage area 113 while inner beam 110 has a more circular ground coverage area 111. Those of skill in the art will recognize that under ideal conditions, only the center beam's ground coverage area will be circular, and that the further out a beam is projected, the more elliptical the ground coverage region will be. This is shown for clarity in FIG. 7.

FIG. 7 shows a top view of a portion of the ground projection areas of a satellite's antenna beams. Region 144, which is shown as circular is produced by a center antenna beam of satellite 12. The center antenna beam must project straight down to produce a circular region, for example, region 144. Regions 143 and 145 are produced by inner antenna beams, which project at an angle to the center beam. Regions 140, 141 and 142 are produced by outer antenna beams (e.g., beam 112 FIG. 6) which are projected at a greater angle than the inner antenna beams. As discussed in relation to FIG. 6, because of the angle of projection, regions 140–142 are elliptical and substantially larger than inner regions 143, 145.

FIG. 8 shows the approximate distances associated with a ground projection region of an outer beam. Outer antenna beam coverage region 120 would be analogous to coverage region 113 of FIG. 6. Distance 124 is the distance from point 105 where the satellite would be directly overhead to outer antenna beam ground coverage region 120 at point 125. In a preferred embodiment, this distance ranges between 600 and 800 miles, and is preferably about 700 miles. Distance 126 is the width or radial distance across outer antenna beam ground coverage region 120, which is shown extending from point 125 to point 135 In the preferred embodiment, this distance is between 700 and 1000 miles, and is preferably about 800 miles. Distance 121 is the distance from the satellite to the outer edge of outer antenna beam coverage region 120 at point 135, and distance 122 is the distance from the satellite to the inner edge of outer antenna beam coverage region 120 at point 125. In the preferred embodiment, distance 121 is on the order of 1500 mile to 1600 miles. Distance 122 ranges from around 800 to 850 miles.

To access communication system 10 (FIG. 1) through satellite 12, subscriber unit 26 (FIG. 1) located at or near the surface of the Earth must access a satellite during the proper timing window, and at the proper frequency. When the subscriber unit is located in an outer antenna beam, such as region 120, the propagation delay of a signal transmitted from the subscriber unit to the satellite at one end of the region is significantly different than the propagation delay associated with a signal on the other end of the region. When the difference between the propagation delays exceeds the timing window of the satellite, the subscriber unit does not know when to transmit so that it's signal arrives within the satellite's timing window, as explained below.

The subscriber unit on the ground receives transmissions from the satellite and needs to precorrect the timing of its signal (i.e., by transmitting early) in order to arrive in sync with the timing window of the satellite. The subscriber unit needs to correct its transmit time based upon twice the distance from the subscriber unit to the satellite. Since radio signals travel at approximately 186,000 miles/sec, in the preferred embodiment, the round trip time delay associated with a signal ranges from 8.94 msec at the inner portion of region 120 to 16.84 msec at an outer portion of region 120. This gives a total range of about 8 msec, from when the subscriber unit is at one end of region 120 to the other end of region 120. If the received timing window at the satellite is much less, for example between 4 and 5 msec wide, the subscriber unit needs to know where in the beam it is in order to hit the timing window of the satellite. Inner beam ground projections (i.e., regions 143, 144 and 145 (FIG. 9) have round trip delay ranges of less than 4 msec. Therefore, for most inner beams it is sufficient to know which beam is proving coverage in order to estimate a timing advance adjustment which will place an initial acquisition signal of a subscriber unit into the timing window at the satellite.

An initial access message must entirely fit within a timing window of a satellite. This is because in a TDMA system, transmission during incorrect times may overlap with an existing call in an adjacent time slot and interfere with the call. The level of interference to a user in the adjacent time slot depends on the number of calls being made in the area.

Based on the distances involved in the preferred embodiment, a subscriber unit must know it's radial position from the satellite to within plus or minus approximately 160 miles to sufficiently determine the proper transmission time so that it's acquisition signal arrives in sync with the satellite's timing window. This is the equivalent to knowing which third of the outer beam the subscriber unit is located in.

Many methods are suitable to determine the location of a subscriber unit within plus or minus 160 miles. In the preferred embodiment, the subscriber unit measures the signal strength of neighboring antenna beams of a satellite to accurately determine its position. A suitable method determination the location of a subscriber unit is disclosed in co-pending U.S. patent application Ser. No. 08/237,705, titled "LOCATION DETERMINATION METHOD AND SYSTEM USING MULTI-BEAM SATELLITES", filed on May 3 of 1994, and is incorporated herein by reference.

FIG. 9 shows the approximated distances associated with far outer regions having reduced signal levels. In addition to what is shown in FIG. 8, FIG. 9 shows reduced signal level region 130. This region may extend a distance 127 from the outer edge of region 120. Distance 127 may be up to 400 miles. In the preferred embodiment, the total distance from point 105 directly below the satellite, to point 145 at the outer edge of region 130 may be as far as 1900 to 2000 miles. Outages in adjacent satellites may cause coverage from the outer beams of neighboring satellites to extend beyond their intended coverage into region 130. If a subscriber unit in region 130 desired to communicate with satellite 12, the maximum round trip delay would be extended from about 8 msec in region 120 to 21 msec. This results in about 12 msec of round trip timing differential from far end point 145 to close end point 135 of far region 130. In the preferred embodiment, the 12 msec timing differential is approximately 3 times the allowed timing window of 4 msec for the satellite.

In reference to FIG. 7, consider the situation where a subscriber unit is located in outer beam region 141. The subscriber unit first successfully determines that it is in the coverage area of beam region 141 by looking for a maximum signal strength beam. Next, the subscriber unit still needs to deal with the fact that the timing correction it needs to handle varies from 9 to 21 msec across region 141, which is a 12 msec range. Since the satellite receive window is only 4 msec wide, the subscriber unit needs to locate itself to within one third to one fourth the radial length of region 141. In a preferred embodiment, the subscriber unit uses a combination of differential power measurements on nearby beams and "hunting".

Differential power measurements can be used by a subscriber unit in beam region 141 to determine if it is close to the inner beam end of beam region 141. If the subscriber unit can see signals from beam regions 143 and/or 145, it can assume that it is close to that end of beam region 141 and set the timing precorrection appropriately. However, for the approximately remaining two-thirds of the length of beam region 141, only adjacent neighbor beams are visible. This may help resolve the subscriber unit's position from one side of the beam to another, but does nothing for resolving the radial distance from the satellite. Therefore, if the subscriber unit determines that it is not at the inner beam end of beam region 141, it must "hunt" over possible timing advances in order to try to get into the timing window, if no other location means is available. "Hunting" refers to the fact that the entire 12 msec range can be covered with three (perhaps four) pre-defined timing corrections. For the example of a round trip delay ranging from 9 to 21 msec, the pre-defined timing corrections may be 11, 15, and 19 msec, each allowing a ±2 msec range of error.

There are several problems associated with hunting. For example, a subscriber unit has 3 to 4 timing corrections to try when making an access attempt. When the unit does not get a response from the satellite, it cannot be sure that the timing correction used was wrong since the message to the satellite may have been lost due to ground interference, a collision from another subscriber unit, or a fade. Likewise, even if the message got to the satellite, a response may also not be received due to a fade. Therefore, the hunt process can be rather slow, especially since the subscriber unit needs to wait some time (for example, about half a second) for a response to each try.

Furthermore, hunting causes interference to adjacent traffic channels. For example, in one preferred embodiment, the receive data slot at the satellite is approximately 4.0 msec wide with approximately 4.4 msec margin. If as discussed above, the round trip timing differential is up to 12 msec off, an access attempt can cause interference to adjacent traffic bearing time-slots.

Another problem with hunting is that if access channels on the satellite are time-slot adjacent, hunting can cause the uplink message to appear inside an adjacent access channel. When this occurs, the satellite will assume that the subscriber unit intended to appear in that access channel, and will therefore send it to a traffic channel based upon timing relative to that channel, not the access channel the subscriber unit originally intended to hit. The end result is that the subscriber unit will show up exactly one time-slot off when it goes to the target channel, which could cause interference to the adjacent channel and will drop the call the user is trying to place.

Figure 10:
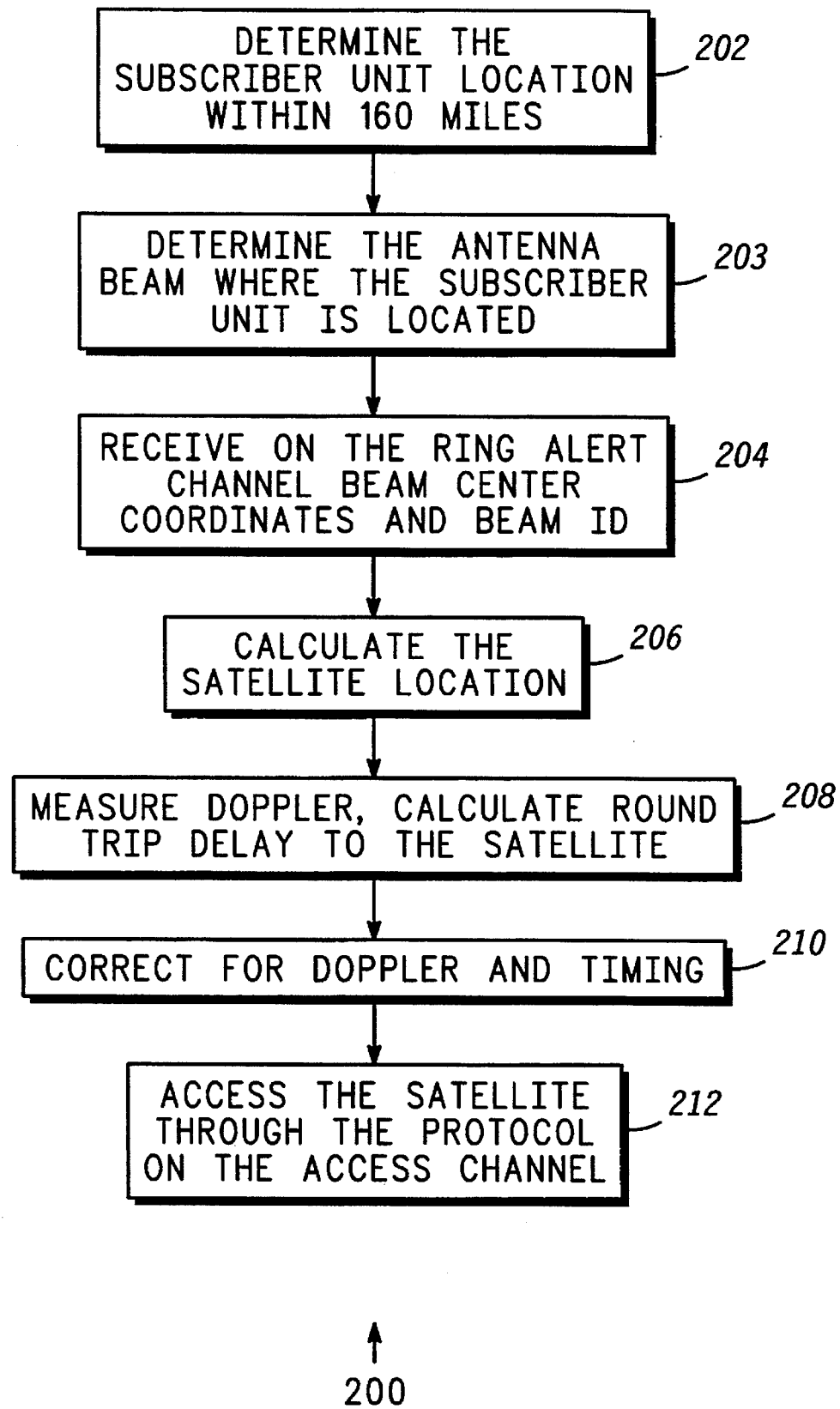
FIG. 10 shows a flow chart of a procedure for synchronizing a subscriber unit to a communication system.

FIG. 10 shows a flow chart of procedure 200 for synchronizing a subscriber unit to a communication system. Task 202 determines the location of the subscriber unit to within a predetermined range or radial distance from the satellite ground center. The range is based upon the timing window of the satellite and in the preferred embodiment is within plus or minus 160 miles. Many methods of location determination are suitable for use by task 202. In the preferred embodiment of the present invention, the location determination method disclosed in co-pending U.S. patent application Ser. No. 08/237,705, assigned to the same assignee as the present application can be used.

Task 203 determines which antenna beam projected from the satellite the subscriber unit is presently located in. Although as part of task 202, the subscriber unit may have determined its location using information about the beam it is in, task 202 may require from several seconds to up to one minute to perform this task. During this time, the beam in which the subscriber unit was located may have moved because the satellites are traveling at a high rate of speed. Therefore, the beam in which the subscriber unit was located used to help determine the location of the subscriber unit may no longer be the beam in which it is presently located. Therefore, it is necessary to determine which beam the subscriber unit is presently located so that the subscriber does not attempt to access a prior beam. Task 203 is preferably accomplished by measuring the beam having the strongest signal. Alternatively, the beam closest to the current calculated position can be used or the beam providing the best calculated coverage of the current calculated position could be used.

In task 204, the satellite provides the coordinates of the center of the ground projection of the beam and the beam ID. The center of the ground projection is not strictly necessary. For example, the locational information provided could simply be the ground track position of the satellite. Given the subscriber unit's knowledge of the relationship of the satellite ground track to the position of the individual beam projections, The subscriber unit may calculate its local beam position. When the local beam co-ordinates are sent down, the beam ID is used to establish two things: (1) The relationship of the beam center to the position of the satellite and (2) which beam is the local beam so that the subscriber unit has an opportunity to use a pre-stored representation of the coverage area and shape of that beam. One other piece of information that is desirably sent down is a north bound/south bound indication. This tells the subscriber unit whether the satellite is traveling northward (beam constellation is turned one way) or southward (beam constellation is flipped 180 degrees around). Alternatively, a subscriber unit can calculate two successive satellite locations to establish the direction of travel.

In the preferred embodiment, the subscriber unit can receive this information while it is watching for a ring alert to be issued to it. A ring alert indicates that someone is attempting to call a particular subscriber unit.

In task 206, the subscriber unit calculates the location of the satellite. The subscriber unit has knowledge of the shape and coverage area of each beam. It also knows the relationship of the center of each beam to the satellite's position over the earth. This would include such knowledge as the satellite's approximate height above the earth's surface.

In task 208, the subscriber unit calculates the Doppler and timing necessary to synchronize with the timing and frequency at the orbiting satellite. With regard to timing, the subscriber unit receives a time-delayed version of the signal from the satellite. This time delay is caused by the propagation delay of the radio signal, approximately 186,000 miles per second. If the subscriber unit were to respond to the satellite in sync with the signal the subscriber unit sees from the satellite, the signal would arrive at the satellite late and out of sync by an amount of time equivalent to twice the one way radio signal propagation delay for that distance. Therefore, for the subscriber unit's signal to end up at the satellite in sync with the satellite's timing, the subscriber unit must transmit its signal early by the amount of twice the estimated one way propagation delay, which is directly proportional to the subscriber unit's estimate of the distance to the satellite.

The subscriber unit knows its current position from task 202 and can determine the satellite's current position from the beam ID and beam center coordinates. The subscriber unit also knows the relationship of beam center to satellite position. With this information, the subscriber unit can determine the distance to the satellite, and hence the timing correction necessary for transmission.

The Doppler frequency shift associated with the satellite's motion can be observed directly by measuring the change in the satellite's timing. Alternatively, the Doppler frequency shift can be calculated by using the knowledge of the satellite distance, bearing, and speed information.

Task 210 corrects the Doppler and timing so that the subscriber unit can access the satellite. The subscriber unit may wish to access the satellite for reasons such as initiating a telephone call origination from the subscriber unit or in response to a page issued by the system telling the subscriber unit that there is an incoming call for it. In task 212, the subscriber unit initiates an acquisition protocol using the corrected frequency and timing window.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

Those of skill in the art will appreciate that a new and novel method and apparatus for accessing a communication system that projects antenna beams that are hundreds or even thousands of miles in length has been described. Furthermore, a new and novel method and apparatus for synchronizing to a communication system's timing windows where the distance the subscriber units are unknown has been described. Also described is a subscriber unit that determines its position relative to a communication station and sends acquisition signals in sync with the system's acquisition timing windows. Also described is a method and apparatus of initially accessing a Time Division Multiple Access (TDMA) communication system without interfering with ongoing calls in adjacent time slots and adjacent frequency channels.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for accessing a communication system by a subscriber unit, said communication system comprising at least one communication station that projects a plurality of antenna beams on the surface of the Earth and is moving with respect to the surface of the Earth, said method comprising the steps of:

(a) determining, by said subscriber unit using said one communication station, a first location of said subscriber unit;

(b) determining one of said antenna beams in which said subscriber unit is located;

(c) receiving from said one communication station, a beam center identification indicating a center of a ground projection of said one antenna beam;

(d) determining a second location of said one communication station using said beam center identification;

(e) calculating a propagation time to said one communication station based on the difference between said first and second locations; and (f) transmitting an acquisition request to said one communication station at a time based on said propagation time, wherein said acquisition request arrives at said one communication station within a timing window.

2. A method as claimed in claim 1 further comprising the step of: (g) calculating a timing advance to synchronize said subscriber unit to said one communication station, said timing advance being based on said propagation time and being approximately twice said propagation time.

3. A method as claimed in claim 1 further comprising the steps of:

(g) estimating a velocity of said one communication station with respect to said subscriber unit;

(h) calculating a frequency shift associated with said velocity; and (i) adjusting a transmission frequency of said acquisition request based on said frequency shift.

4. A method as claimed in claim 1 wherein step (b) comprises the steps of: determining said one of said antenna beams by measuring a power level of each of said antenna beams; and choosing said one of said antenna beams having a greatest power level.

5. A method as claimed in claim 1 wherein step (c) comprises the step of receiving said beam center identification indicating a ground projection center of said one communication station.

6. A method as claimed in claim 1 wherein step (a) comprises the step of determining said first location within a predetermined range, said predetermined range based on said timing window.

7. A method as claimed in claim 6 wherein step (a) further comprises the step of determining said first location within said predetermined range, said predetermined range being within a 160 mile radial accuracy from a center ground projection of said one communication station.

8. A method as claim in claim 1 wherein said step (c) comprises the step of receiving said beam center identification on a ring alert channel, and wherein said beam center identification includes coordinates of said center of said one antenna beam.

9. A method as claimed in claim 1 wherein step (b) comprises the step of determining said one of said plurality of antenna beams in which said subscriber unit is located, said one antenna beam being an outer beam of said plurality and having a substantially elliptical ground projection.

10. A method as claimed in claim 9 wherein said one communication station has a receive timing window for receiving said acquisition request, and wherein step (b) comprises the step of determining said one antenna beam, and wherein a difference between said propagation time associated with a near end of said one antenna beam and said propagation time associated with a far end of said one antenna beam exceeds said receive timing window.

11. A method as claimed in claim 10 wherein said timing window is between three and four milliseconds, and said difference is between ten and twenty-one milliseconds.

12. A method as claimed in claim 1 wherein step (a) comprises the steps of:
   (a1) receiving at said subscriber unit, a signal comprising information unique to said one of said antenna beams;
   (a2) processing a beam geometry based on said information to determine a region where said subscriber unit is located, said beam geometry being stored in said subscriber unit; and
   (a3) comparing said region with a stored value of a last reported region.

13. A subscriber unit that synchronizes to a timing window of a communication station, said communication station projecting a plurality of antenna beams on the surface of the Earth and moving with respect to the surface of the Earth, said subscriber unit comprising:
   an receiver for receiving a beam center identification from said communication station;
   a processor for determining a first location of said subscriber unit within a predetermined range and determining one of said plurality of antenna beams within which said subscriber unit is located;
   a memory for storing antenna pattern information for said communication station; and
   a transmitter for transmitting an acquisition request to said communication station,
   said processor determining a second location of said communication station using said beam center identification and calculating a propagation time to said communication station based on a difference between the first and second locations, said transmitter transmitting said acquisition request based on said propagation time.

14. A subscriber unit as claimed in claim 13 wherein said processor includes means for calculating a timing advance which is approximately twice said propagation time, and wherein said transmitter includes means for transmitting said acquisition request at a time ahead by said timing advance, said acquisition request being received at said communication station within a predetermined timing window.

15. A subscriber unit as claimed in claim 13 wherein said beam center identification indicates a center location of one antenna beam.

16. A subscriber unit as claimed in claim 13 wherein said processor includes means for determining said first location by measuring power levels of said antenna beams of said communication station.

17. A subscriber unit as claimed in claim 13 wherein at least some of said antenna beams are projected at an angle with respect to the surface of the Earth producing substantially elliptical ground projection regions, said ground projection regions having a timing differential from a near end to a far end exceeding an acquisition timing window of said communication station.

18. A subscriber unit as claimed in claim 17 wherein said timing differential is between ten and twenty-one milliseconds, and said timing window is between three and four milliseconds.

19. A method of operating a subscriber unit in a communication system comprising at least one low-Earth orbiting satellite that projects a plurality of moving antenna beams onto the surface of the Earth, at least some of said antenna beams extending a radial distance from an overhead point of said satellite, said method comprising the steps of:
   (a) determining a location of said subscriber unit within a predetermined range, said predetermined range based on an acquisition timing window of said satellite;
   (b) determining a propagation distance from said subscriber unit to said satellite using said location and beam center information received from said satellite; and
   (c) transmitting an acquisition request to said satellite at a time advanced by approximately twice a propagation time based on said propagation distance.

20. A method as claimed in claim 19 wherein said radial distance is large enough to cause a differential propagation time across an antenna beam within which said subscriber unit is located to exceed said acquisition timing window of said satellite, and wherein step (a) comprises the step of determining said location within said predetermined range, said predetermined range having said differential propagation time less than said timing window.

* * * * *